Aug. 25, 1959

M. E. HOMAN 2,901,675

ERROR CHECKING APPARATUS

Filed Sept. 9, 1957

*INVENTOR.*
MERLE E. HOMAN

BY Harry T. Berriman

AGENT

United States Patent Office 2,901,675
Patented Aug. 25, 1959

2,901,675

ERROR CHECKING APPARATUS

Merle E. Homan, Poughkeepsie, N.Y., assignor to International Business Machines Corporation, New York, N.Y., a corporation of New York Application September 9, 1957, Serial No. 682,968

2 Claims. (Cl. 317—140)

This invention relates to an improved error checking apparatus of the type utilized to determine whether an odd or an even number of signal responsive devices have been energized as the result of signals previously applied thereto.

In control circuitry of the type comprising a plurality of settable devices such as relays or the like, which are adapted to be set singly or in combination to a particular predetermined state as a result of multi-element code signals applied thereto, the multi-element code actuating signals may be predetermined to always have either an odd or an even number of elements. By checking the settable devices after each setting thereof, to determine if an odd or even number of the devices have been set, an indication is obtained as to the accuracy of response of the settable devices to the applied signals, the accuracy of transmission of the multi-element signal, and the accuracy of the signals themselves. Thus if each multi-element signal is predetermined when correct, to always have an odd number of elements or bits, a checking of the settable devices after each applied code signal should always find an odd number of the devices set, in order for a correct setting to be assumed.

When the settable devices are a series of relays, various contact points of which may be utilized in appropriate circuitry to achieve control indications in accordance with the particular relay or combination of relays energized, the error checking apparatus may be obtained by providing one of the relays of the group with a single additional contact of the transfer type and providing each of the remaining relays with two additional contacts of the transfer type. These additional contacts may be interconnected to form an analyzing circuit which will provide a continuous circuit path from an input end thereof to an output end thereof, if, for example, only an odd number of the associated relays have been energized. The existence of the circuit path through the analyzing circuit is detected by applying a current impulse to the input of the analyzing circuit from a suitable source such as a cam actuated contact. The cam impulse passes through the analyzing circuit to the output thereof and is then utilized to energize a relay which may, for example, be defined as an odd check relay. The energizations of the odd check relay may be utilized to give a control indication that an odd number of the relays were set. If, after the impulse is applied to the analyzing circuit, the odd check relay is not energized, this indicates that there is no circuit path through the analyzing circuit and an even or erroneous number of the original relays are assumed to have been energized. If desired, the check relay may be energized only when the analyzing circuit indicates an even setting, while a failure to energize might indicate an erroneous, or odd number of relays set in response to the applied coded signals.

It is evident that if there is a relay contact failure in the error check analyzing circuit, the continuous circuit path may not be completed, even though a correct odd number of relays as per our example, have been energized. Thus the error checking circuit may itself be a source of possible errors. In the subject invention there is provided by the addition of a single additional contact of the transfer type to one of the relays of the group, and a few additional conductors, a distinct and separate check path through the analyzing circuit, from the cam contact, to the check indicating relay, when the relays are properly energized (odd or even total as desired). This second circuit path accordingly provides a substantial increase in reliability of the actual check circuit itself in an efficient and economical manner. If intermittent failures of a purely random nature are assumed, the probability of successful checking for the two checking paths would equal the square of the probability of success for the single path.

It is accordingly a broad object of the invention to provide an improved and more reliable analyzing circuit for indicating whether an odd or an even number of a group of settable devices have been energized.

It is a further object to provide an analyzing circuit for providing a pair of parallel circuit paths through which a current responsive indicating device may be energized, the paths being established under the control of a group of relays in correspondence to an energization of either an odd or an even number of the relays, as predetermined.

A further object of the invention is in a checking device utilizing a check circuit path indicating whether an odd or even number of settable devices as predetermined, have been set, the provision of a parallel check path without a 100 percent increase in circuitry, the two check paths providing, in the case of intermittent check failures of a purely random nature, a probability of error check accuracy equal to the square of the probability of success for the single path.

Other objects of the invention will be pointed out in the following description and claims and illustrated in the accompanying drawings, which disclose, by way of example, the principle of the invention and the best mode, which has been contemplated, of applying that principle.

Figure 1:
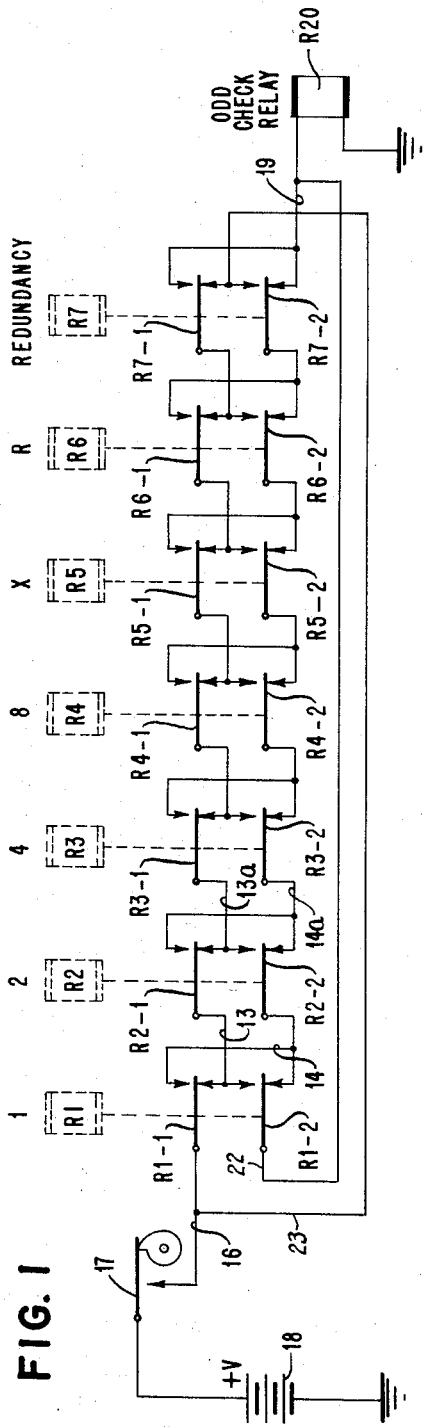
Fig. 1 is a schematic circuit representation of the improved error checking apparatus which provides two parallel check circuit paths.
Figure 2:
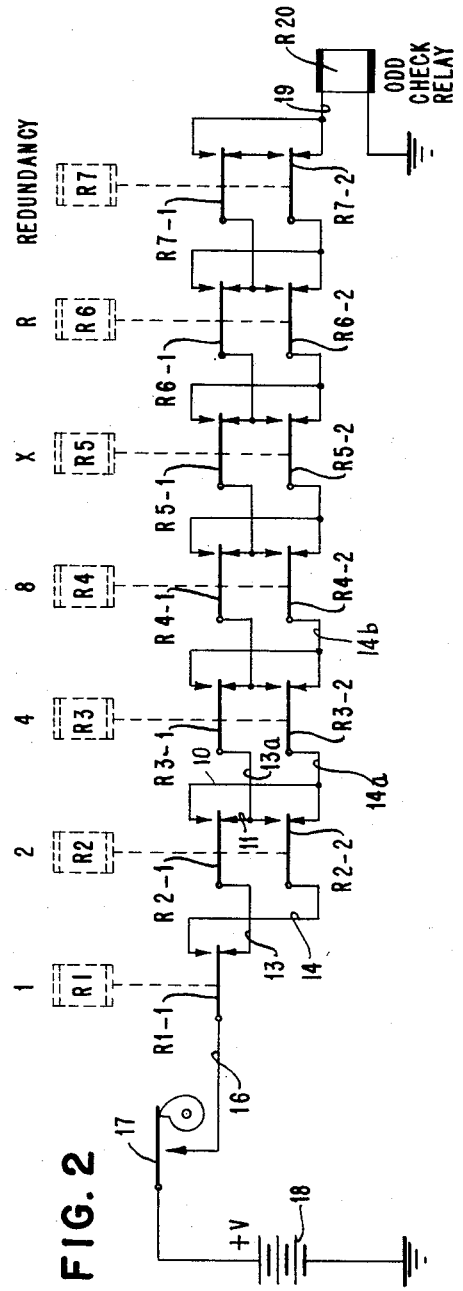
Fig. 2 is a schematic circuit representation of an error check apparatus having only one possible check path of the type previously known in the art.

Referring to Fig. 2, there is shown checking apparatus of a type well known in the art and which is incorporated in entirety into the improved checking apparatus as shown in Fig. 1. In order to give a better understanding of the improvement in operation achieved by the improved checking apparatus shown in Fig. 1, the known prior art apparatus as shown in Fig. 2 will be described first. In Fig. 2 there are provided a number of relays designated R1, R2, R3, R4, R5, R6 and R7, one for each of the respective elements 1, 2, 4, 8, X, R and redundancy of a 7 element or bit combinational, each of the relays being representative of its assigned representation when energized. Each of the relays R1 to R7 is adapted to be energized singly or in combination in any well known manner, not indicated, in direct correspondence to the particular elements or bits present in an applied coded signal. For example, in the representative 7 element code arrangement indicated, the letter A might be designated by the presence of 1 and X elements or bits in the applied signal, and the related R1 and R5 relays would be energized. Similarly, if the coded signal is to be representative of the numeral 5, the 1 and 4 elements would be present and would effect an energization of the related R1 and R4 relays of Fig. 2.

In order to permit a checking of accuracy of response of the relays R1 through R7, and also the accuracy of each actual applied multi-element signal in effecting a related energization of the related ones of the relays R1 through R7, it may be predetermined that the number of elements in any signal must always be an odd number, for example. This is effected by providing or not providing a bit in the 7th element position in accordance with the bit count in the rest of the elements of the applied signal, so that the bit count is always odd. Thus in our previous example wherein the letter A is represented by a 1 and X bit—giving an even bit count—an additional bit is carried with the signal in the 7th or redundancy position to give a total of three or an odd number of bits for that signal. As a further example, if the number 4 is represented by a single bit in the 4 element position thus effecting an energization of the related R4 relay, the bit count is already odd so that the redundancy or 7 bit element is not required.

There are provided with each of the relays R1 through R7, various associated contacts (not shown), which in association with the proper known circuitry, will provide a particular control indication in correspondence to the particular number, character, etc., as represented by the energized state of the related one or ones of the relays R1 through R7, after the application of the related multi-element code actuating signal. In addition to the various relay contacts provided for the above described control circuitry, there is provided two additional contacts for each of the relays R2 through R7, and one additional contact for the R1 relay. Each of these additional contacts is of the transfer type having a normally open (N.O.) and normally closed (N.C.) side. For ease of reference, each of these additional contacts is labeled R1–1, R2–1, R2–2, R3–1, R3–2, etc. as indicated in Fig. 2, in correspondence to the particular relay R1, R2, R3, etc., by which it is controlled. The R2–1 N.O. contact is electrically commoned by a jumper 10 to the associated R2–2 N.C. contact. Similarly, the R2–1 N.C. contact is electrically commoned by a jumper 11 to the associated R2–2 N.O. contact. The contact R3–1 N.O. and R3–2 N.C. contacts, R4–1 N.O. and R4–2 N.C. contacts, R5–1 N.O. and R5–2 N.C., R6–1 N.O. and R6–2 N.C., and R7–1 N.O. and R7–2 N.C. contacts are all similarly jumpered in the same manner as the R2–1 N.O. and R2–2 N.C. contact. The contacts R3–1 N.C. and R3–2 N.O., the R4–1 N.C. and R4–2 N.O., the R5–1 N.C. and R5–2 N.O., the R6–1 N.C. and R6–2 N.O., and the R7–1 N.C. and R7–2 N.O. contacts are similarly jumpered in the same manner as the R2–1 N.C. and R2–2 N.O. contacts. The R1–1 N.C. contact is connected by a conductor 13 to the R2–1 contact transfer strap as indicated, while the R1–1 N.O. contact is connected by a conductor 14 to the R2–2 contact transfer strap as indicated. The jumpered R2–1 N.C. and R2–2 N.O. contacts are connected by a conductor 13a to the transfer strap of the R3–1 contacts, the jumpered contacts R3–1 N.C. and R3–2 N.O. are connected by a conductor 13b to the succeeding relay transfer strap of the #1 contacts thereof, and so forth for the succeeding relay contacts as indicated. Similarly the jumpered R2–1 N.O. and the R2–2 N.C. contacts are connected by a conductor 14a to the transfer strap of the R3–2 contact, the jumpered contacts R3–1 N.O. and R3–2 N.C. are connected by a conductor 14b to the succeeding relay transfer strap of the #2 contacts thereof, and so forth as indicated.

The transfer strap of the R1–1 contacts is connected through a conductor 16 to a fixed contact portion of a cam actuated contact 17. The movable contact strap of the latter is connected to the plus terminal of a battery 18, the negative terminal of the latter being grounded. The jumpered R7–1 N.O. and the R7–2 N.C. contacts are connected through a conductor 19 to the one lead of a so-called odd check relay R20, the other lead of the latter being grounded. After the relays R1 through R7 have been singly or combinationally energized in accordance with the applied multi-element code signal, the cam contact 17 closes and a circuit will be completed from the battery 18, through the contact 17, the conductor 16, and a circuit established through the relay contact maze indicated, provided an odd number of the relays have been energized, and then through the conductor 19 to energize the odd check relay R20. The energization of the relay R20 controls circuitry (not shown) which indicates that an odd number of the relays R1 through R7 were energized and the relays may be assumed to correctly represent the coded signal representation.

For example, assume that the coded signal representation is the character A which comprises bit elements 1, 5 and redundancy, thus effecting a corresponding energization of the respective R1, R5 and R7 relays. With these relays energized, their respective R1–1, R5–1, R5–2, R7–1 and R7–2 straps transfer. Thereafter, with the closing of the cam contact 17, a circuit is available therefrom through the R1–1 N.O. contact, now closed, through conductor 14, the R2–2 N.C. contacts, still closed, the conductor 14a, the R3–2 N.C. contacts, still closed, the conductor 14b, the R4–2 N.C. contacts, still closed to the transfer strap of the R5–2 contacts, through the N.O side of the contacts, now closed, to the transfer strap of the R6–1 contacts, through the N.C. side, still closed, to the transfer strap of the R7–1 contacts, through the associated N.O. contact side, now closed, to the conductor 19, through the relay R20 to ground. If the relay R20 is not energized through the checking circuit on each closing of the cam contacts 17, the unactuated contact or contacts (not shown) of this relay may be utilized to give an error indication. It is evident, of course, the closing of cam contact 17 is timed to occur after each coded signal setting of the relays R1 through R7.

It is possible in the above checking arrangement that the checking relay may fail to be energized on a closing of the cam contact 17 even though an odd number of the relays have been properly energized. For example, taking the same coded character A as described above, the R1, R5 and R7 relays could be energized and their corresponding contacts transferred in Fig. 2. Assume however, that the R7–1 N.O. contact has a dirty contact area so that even though the transfer strap transfers, no contact is made to the N.O. contact side. Thus the previously traced circuit to energize the relay R20 could not be completed therethrough and an erroneous even bit representation would accordingly be signalled even though an odd number of relays were correctly energized. The checking circuit may thus also be a source of errors. The reliability of the check circuit shown in Fig. 2 could presumably be increased in an obvious manner, by complete duplication of the checking circuit matrix, so that if one circuit were to fail, the other would complete the circuit to energize the check relay R20.

The applicant has found that by taking the circuit of Fig. 2 and adding an additional contact to one of the relays, and also a few additional conductors, a parallel check path through the matrix is achieved, this path using different ones of the relay contact points than the first path, so that a substantial increase in reliability is effected with an economy of apparatus. If intermittent failures of a purely random nature are assumed, the probability of successful checking for the two checking paths would equal the square of probability of success for the single path.

Referring now to Fig. 1 the improved checking apparatus comprises the identical apparatus as Fig. 2 with these additions. The relay R–1 is provided with a second contact R1–2 of the transfer type. This contact is jumpered with the original R1–1 contact in the same manner as the original pairs of contacts of the remaining relays R2 through R7 as will be evident on inspection of the diagram of Fig. 1. A first added conductor 22 is provided which connects the transfer strap of the R1–2 contacts directly to the odd checking relay R20 input as indicated, while a second added conductor 23 connects the transfer strap of the R1–1 contact to the electrically commoned R7–1 N.C. and R7–2 N.O. contacts. With an odd number of the relays R1 through R7 energized, the conventional circuit is provided through the relay matrix contacts to energize the check relay R20, while an additional circuit is established from the strap of the R1–1 contacts, through the added conductor 23 back through the relay contact matrix, utilizing contacts not used in the first circuit, through the added contact R1–2, and the added conductor 22 to the odd check relay R20. Thus in our previous example wherein with the R1, R5, and R7 relays energized in response to an A representative coded character, the same circuit previously described in reference to Fig. 2 between the cam contact 17, through the relay contact matrix, to the odd check relay R20, will also be available in the improved apparatus shown in Fig. 1. In addition, a further circuit will be provided from the conductor 16, through the conductor 23 to the jumpered R7–1 N.C. contact and the R7–2 N.O. contact, through the R7–2 N.O. contact, now closed, through the R6–2 N.C. contacts, still closed, to the jumpered R5–1 N.O. and R5–2 N.C. contacts, through the R5–1 N.O. contact, now closed, through the R4–1 N.C. contacts, through the R3–1 N.C. contacts, through the R2–1 N.C. contacts to the jumpered R1–1 N.C. and R1–2 N.O. contacts, through the R1–2 N.O. contacts, now closed, through the conductor 22 to the odd check relay R20. Thus a second circuit path resulting in a substantial increase in reliability has been achieved in a very simple and economical fashion.

The checking structure shown in Fig. 1 is adapted to provide two circuit paths to the relay R20, when an odd number of the relays R1 through R7, have been energized. If desired, the circuit may be used in a code arrangement wherein it is desired to energize a relay such as R20, only when an even number of relays have been energized. All this circuit requires is a reversal of the conductor 22, and conductor 23 with associated conductor 19 and the relay R20, in the manner in which they are linked to the jumpered contacts of the R7 relay. Thus the conductor 23 would be connected to the jumpered R7–1 N.O. and R7–2 N.C. contacts, while the conductor 22 and conductor 19 leading to the relay R20, would be connected to the jumpered R7–1 N.C. contact and the R7–2 N.O. contact. Also, the 7 element code arrangement illustrated by the relays R1 through R7 and their associated contacts in the checking circuit is only representative, a code system of 4, 5, 9, 10, 11 or any other suitable number of elements can be checked in the same manner as described above, with the related relay controlled contacts in the checking matrix being successively and individually connected in the same manner as described for the representative apparatus of Fig. 1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In an analyzing network of the type controlled by a series of relays wherein the network includes for the first relay of said series a single transfer contact having a transfer strap and a normally open and normally closed contact side, and for each of the other relays of said series, a first and second transfer contact each having a transfer strap and a normally open and a normally closed contact side, the normally closed contact side of the first transfer contact of each relay being electrically commoned with the normally open contact side of the second transfer contact of that same relay and also electrically commoned with the transfer strap of the first transfer contact of the succeeding relay, with the normally open contact side of the first transfer contact of each pair being electrically commoned with the normally closed contact side of the second transfer contact of that same relay and also electrically commoned with the transfer strap of the second transfer contact of the succeeding relay, the normally closed contact side of the single transfer contact of the first relay of said series being electrically connected to the transfer strap of the first contact of the succeeding relay of said series, and the normally open side of the single transfer contact of the first relay of said series being electrically connected to the transfer strap of the second contact of the succeeding relay of said series with a circuit being available from an impulse signal source feeding the transfer strap of said single transfer contact, through said network when an odd number of said relays are energized and their associated contacts transferred, to an impulse responsive device electrically connected to the electrically commoned normally open contact side of the first transfer contact and normally closed contact side of the second transfer contact of the last relay of said series; further characterized by auxiliary apparatus for providing an auxiliary circuit path through said analyzing network from said impulse signal source to said impulse responsive device when an odd number of relays of said series are energized, said auxiliary apparatus comprising, an additional transfer contact for the first relay of said series, said additional contact having a transfer strap and a normally open contact side with an electrical connection therefrom to the normally closed contact side of the transfer contact of that relay, said additional contact also having a normally closed contact side with an electrical connection therefrom to the normally open contact side of said other transfer contact of that relay; and electrical connection linking said input signal source to the electrically commoned normally closed contact side of the first transfer contact and the normally open side of the second transfer contact of the last relay of said series, and an electrical connection linking the transfer strap of said additional transfer contact to said impulse responsive device.

2. In an analyzing network of the type controlled by a series of relays wherein the network includes for the first relay of said series a single transfer contact having a transfer strap and a normally open and a normally closed contact side, and for each of the other relays of said series a first and second transfer contact each also having a transfer strap and a normally open and normally closed contact side, the normally closed contact side of the first transfer contact of each relay being electrically commoned with the normally open contact side of the second transfer contact of that same relay and also electrically commoned with the transfer strap of the first transfer contact of the succeeding relay, with the normally open contact side of the first transfer contact of each said relay being electrically commoned with the normally closed contact side of the second transfer contact of that same relay and also electrically commoned with the transfer strap of the second transfer contact of the succeeding relay, the normally closed contact side of the single transfer contact of the first relay of said series being electrically connected to the transfer strap of the first contact of the succeeding relay of said series, and the normally open contact side of the single transfer contact of the first relay of said series being electrically connected to the transfer strap of the second contact of the succeeding relay of said series, and with a circuit being available from an impulse signal source feeding the transfer strap of said single transfer contact, through said network when an even number of said relays are energized and their associated contacts transferred, to an impulse responsive device electrically connected to the electrically commoned normally closed contact side of the first transfer contact and normally open contact side of the second transfer contact of the last relay of said series; further characterized by auxiliary apparatus for providing an auxiliary circuit path through said analyzing network from said impulse signal source to said impulse responsive device when an even number of relays of said series are energized, said auxiliary apparatus comprising, an additional transfer contact for the first relay of said series, said additional contact having a transfer strap and a normally open contact side with an electrical connection therefrom to the normally closed contact side of the other transfer contact of that relay, said additional contact also having a normally closed contact side with an electrical connection therefrom to the normally open contact side of said other contact of that relay, an electrical connection linking said input signal source to the electrically commoned normally open contact side of the first transfer contact and the normally closed contact side of the second transfer contact of the last relay of said series, and an electrical connection linking the transfer strap of said additional transfer contact to said impulse responsive device.

References Cited in the file of this patent
UNITED STATES PATENTS
2,833,983    Shaw _____ May 6, 1958